United States Patent
Craddock et al.

(10) Patent No.: US 10,108,358 B2
(45) Date of Patent: *Oct. 23, 2018

(54) SYNCHRONOUS INPUT/OUTPUT COMMAND

(71) Applicant: International Business Machines Corporation, Armonk, NY (US)

(72) Inventors: David F. Craddock, New Paltz, NY (US); Beth A. Glendening, Poughkeepsie, NY (US); Dale F. Riedy, Poughkeepsie, NY (US); Harry M. Yudenfriend, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/181,571

(22) Filed: Jun. 14, 2016

(65) Prior Publication Data

US 2017/0097783 A1   Apr. 6, 2017

Related U.S. Application Data

(63) Continuation of application No. 14/872,872, filed on Oct. 1, 2015.

(51) Int. Cl.
| | |
|---|---|
| *G06F 13/14* | (2006.01) |
| *G06F 3/06* | (2006.01) |
| *G06F 13/42* | (2006.01) |

(52) U.S. Cl.
CPC ......... *G06F 3/0619* (2013.01); *G06F 3/0659* (2013.01); *G06F 3/0685* (2013.01); *G06F 13/4243* (2013.01)

(58) Field of Classification Search
None
See application file for complete search history.

(56) References Cited

U.S. PATENT DOCUMENTS

| | | | |
|---|---|---|---|
| 2011/0041039 A1* | 2/2011 | Harari | G06F 11/1068 714/773 |
| 2012/0291038 A1* | 11/2012 | Clevenger | G06F 9/547 718/103 |

(Continued)

OTHER PUBLICATIONS

David F. Craddock et al.,Pending U.S. Appl. No. 14/872,851 entitled "Synchronous Input/Output Using a Low Latency Storage Controller Connection," filed Oct. 1, 2015.

(Continued)

*Primary Examiner* — Ilwoo Park

(74) *Attorney, Agent, or Firm* — Cantor Colburn LLP; Steven Chiu

(57) ABSTRACT

Aspects include sending a request to perform a unit of work that includes a synchronous I/O operation. The sending is from an operating system (OS) executing on a server to firmware located on the server. The synchronous I/O request includes a command request block that includes an operation code identifying the synchronous I/O operation and a identifier of a persistent storage control unit (SCU). The OS waits for the synchronous I/O to complete and the unit of work remains active during the waiting. The firmware detects that the synchronous I/O operation has completed. A command response block that includes completion status information about the synchronous I/O operation is received by the OS from the firmware. The unit of work is completed in response to the I/O operation completing.

7 Claims, 10 Drawing Sheets

Process Flow 900

(56) References Cited

U.S. PATENT DOCUMENTS

| | | | | |
|---|---|---|---|---|
| 2014/0143449 | A1* | 5/2014 | Driever | G06F 12/0646 710/5 |
| 2015/0134857 | A1* | 5/2015 | Hahn | G06F 3/061 710/5 |
| 2016/0055114 | A1* | 2/2016 | Freiwald | G06F 1/10 710/110 |

OTHER PUBLICATIONS

David F. Craddock et al.,Pending U.S. Appl. No. 14/872,857 entitled "Peripheral Device Access Using Synchronous Input/Output," filed Oct. 1, 2015.

David F. Craddock et al.,Pending U.S. Appl. No. 14/872,859 entitled "Synchronous Input/Output Replication of Data in a Persistent Storage . . . ," filed Oct. 1, 2015.

David F. Craddock et al.,Pending U.S. Appl. No. 14/872,872 entitled "Synchronous Input/Output Command ," filed Oct. 1, 2015.

David F. Craddock et al.,Pending U.S. Appl. No. 14/872,914 entitled "Synchronous Input/Output Commands Writing to Multiple Targets," filed Oct. 1 2015.

David F. Craddock et al.,Pending U.S. Appl. No. 14/872,944 entitled "Synchronous Input/Output Command With Partial Completion," filed Oct. 1, 2015.

David F. Craddock et al.,Pending U.S. Appl. No. 14/872,962 entitled "Access Control and Security for Synchronous Input/Output Links," filed Oct. 1, 2015.

David F. Craddock et al.,Pending U.S. Appl. No. 14/872,968 entitled "Synchronous Input/Output Initialization Exchange Sequences," filed Oct. 1, 2015.

David F. Craddock et al.,Pending U.S. Appl. No. 14/872,996 entitled "Synchronous Input/Output Measurement Data," filed Oct. 1, 2015.

David F. Craddock et al.,Pending U.S. Appl. No. 14/873,029 entitled "Synchronous Input/Output Diagnostic Controls," filed Oct. 1, 2015.

David F. Craddock et al.,Pending U.S. Appl. No. 15/180,137 entitled "Peripheral Device Access Using Synchronous Input/Output," filed Jun. 13, 2016.

David F. Craddock et al.,Pending U.S. Appl. No. 15/181,536 entitled "Synchronous Input/Output Using a Low Latency Storage Controller Connection," filed Jun. 14, 2016.

David F. Craddock et al.,Pending U.S. Appl. No. 15/181,548 entitled "Synchronous Input/Output Replication of Data in a Persistent Storage . . . ," filed Jun. 14, 2016.

David F. Craddock et al.,Pending U.S. Appl. No. 15/182,189 entitled "Synchronous Input/Output Commands Writing to Multiple Targets," filed Jun. 15, 2016.

David F. Craddock et al.,Pending U.S. Appl. No. 15/182,861 entitled "Synchronous Input/Output Command With Partial Completion," filed Jun. 15 2016.

David F. Craddock et al.,Pending U.S. Appl. No. 15/182,878 entitled "Access Control and Security for Synchronous Input/Output Links," filed Jun. 15, 2016.

David F. Craddock et al.,Pending U.S. Appl. No. 15/183,139 entitled "Synchronous Input/Output Initialization Exchange Sequences," filed Jun. 15, 2016.

David F. Craddock et al.,Pending U.S. Appl. No. 15/183,168 entitled "Synchronous Input/Output Measurement Data," filed Jun. 15, 2016.

David F. Craddock et al.,Pending U.S. Appl. No. 15/183,215 entitled "Synchronous Input/Output Diagnostic Controls," filed Jun. 15, 2016.

List of IBM Patents or Patent Applictions Treated as Related; (Appendix P), Filed Jan. 4, 2017, 2 pages.

\* cited by examiner

SYNCHRONOUS INPUT/OUTPUT COMMAND

DOMESTIC PRIORITY

This application is a continuation of U.S. patent application Ser. No. 14/872,872, filed Oct. 1, 2015, the content of which is incorporated by reference herein in its entirety.

BACKGROUND

The disclosure relates generally to input/output (I/O) on a computer, and more specifically, to a synchronous I/O command.

In general, the technical field discussed herein includes communications between servers and storage control units over a storage area network involving multiple switches and multiple layers of a protocol stack. Contemporary implementations of these communications between servers and storage control units include asynchronous access operations by operating systems within the storage area network. Asynchronous access operations require queues and schedulers for initiating the requests, along with interruptions for any associated context switch for processing a completion status. These queues, schedulers, and interruptions amount to asynchronous overhead that adds significant latency and processing delays across the storage area network.

Storage Area Networks (SANs), as described by the Storage Networking Industry Association (SNIA), are high performance networks that enable storage devices and computer systems to communicate with each other. In large enterprises, multiple computer systems or servers have access to multiple storage control units within the SAN. Typical connections between the servers and control units use technologies such as Ethernet or Fibre-Channel, with the associated switches, I/O adapters, device drivers and multiple layers of a protocol stack. Fibre-channel, for example, as defined by the INCITS T11 Committee, defines physical and link layers FC0, FC1, FC2 and FC-4 transport layers such as the Fibre Channel Protocol (FCP) for SCSI and FC-SB-3 for Fibre Connectivity (FICON). There are many examples of synchronous and asynchronous I/O access methods, each with their own advantages and disadvantages. Synchronous I/O causes a software thread to be blocked while waiting for the I/O to complete, but avoids context switches and interrupts. This works well when the I/O is locally attached with minimal access latency, but as access times increase, the non-productive processor overhead of waiting for the I/O to complete becomes unacceptable for large multi-processing servers. The current state of the art for server access to SAN storage, with its associated protocol over-head, is to use asynchronous I/O access methods. The large variation in access times, and even the minimum access times, of SAN storage with today's protocols such as Fibre-Channel, make synchronous I/O access unacceptable.

SUMMARY

Embodiments include a method for performing synchronous input/output (I/O) operations. A request to perform a unit of work that includes a synchronous I/O operation is sent from an operating system (OS) executing on a server to firmware located on the server. The synchronous I/O request includes a command request block that includes an operation code identifying the synchronous I/O operation and a identifier of a persistent storage control unit (SCU). The OS waits for the synchronous I/O to complete and the unit of work remains active during the waiting. The firmware detects that the synchronous I/O operation has completed. A command response block that includes completion status information about the synchronous I/O operation is received by the OS from the firmware. The unit of work is completed in response to the I/O operation completing. When compared to traditional I/O, embodiments can provide the ability to eliminate the overhead associated with a dispatcher, improve transactional latency, preserve contents of Level 1 and Level 2 cache by eliminating a context switch, and reduce lock contention on data.

In an embodiment, the synchronous I/O operation can be a synchronous read operation and the detecting includes determining that data from the persistent SCU has been written to a memory location on the server. This can provide additional reductions in transactional latency.

In an embodiment, the synchronous I/O operation is a synchronous write operation and the detecting includes receiving a status message in a memory location on the server indicating that the synchronous I/O operation has been completed. This can provide additional reductions in transactional latency.

In an embodiment, the completion status information in the command response block can indicate that the synchronous I/O operation completed successfully. This can provide additional reductions in overhead.

In an embodiment, the completion status information in the command response block can indicate that the synchronous I/O operation completed in an error state. This can provide additional error detection.

In an embodiment, the method can also include creating the command request block based on requirements of the synchronous I/O operation. This can provide additional reductions in overhead.

In an embodiment, the OS can utilize contents of the command response block to determine a next action by the OS. This can provide additional reductions in overhead.

Additional embodiments include systems and computer program products to implement the above methods.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
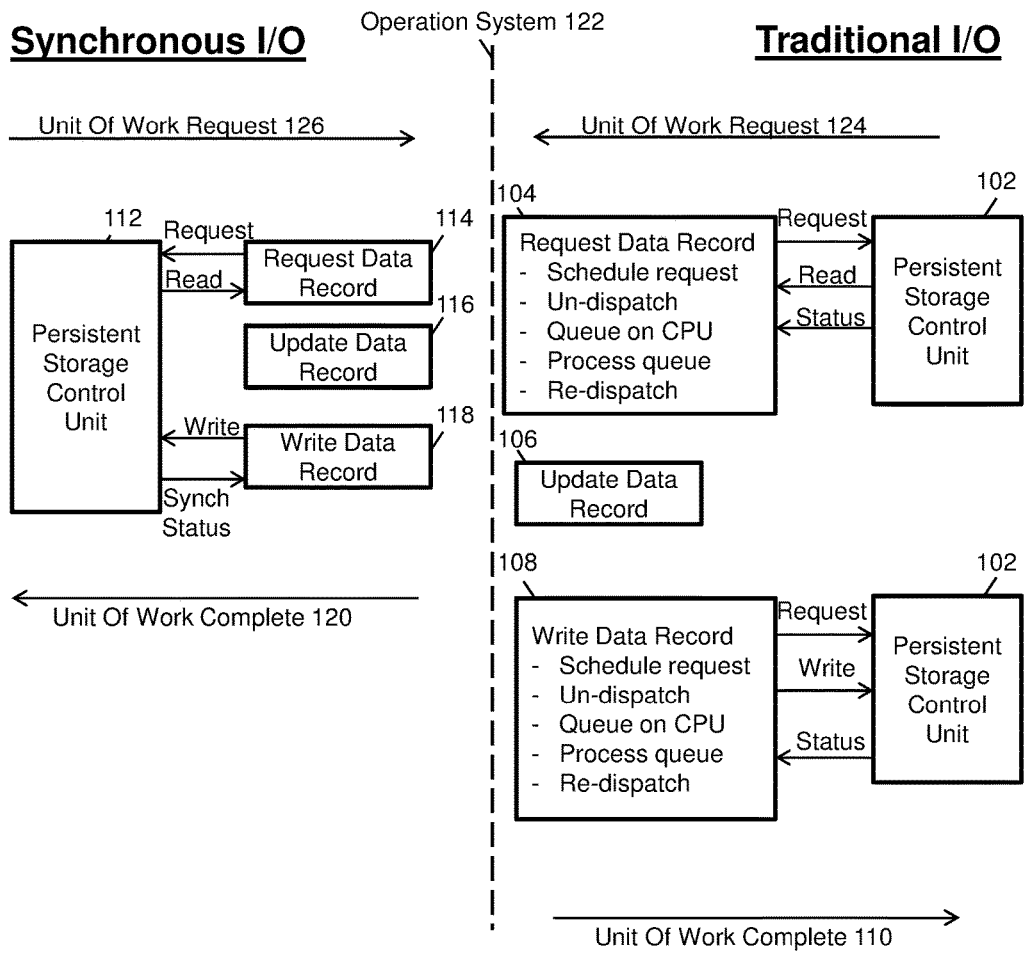
FIG. 1 illustrates a communication schematic comparing synchronous input/output (I/O) and traditional I/O in accordance with an embodiment.

Embodiments include a synchronous input/output (I/O) command that can be sent from an operating system (OS) running on a processor to firmware running on a processor. The firmware performs validation of the request and maps the request to a mailbox command that is sent to a persistent storage control unit (SCU) to initiate a synchronous I/O operation between the processor and the persistent SCU. In embodiments described herein, parameters are provided by the operating system in the synchronous I/O command to the firmware executing on the processor. The parameters can be used to identify a link to be used for this I/O operation and the attached control unit, to define a location in a memory on the processor to which a data record will be fetched or stored; to specify the specific operation to be performed; to provide protection information to determine if the access is authorized; and/or to provide device information relative to the location of the data record in the persistent SCU. Status information that incudes diagnostic information for failure analysis can also be provided. Embodiments of mechanisms are also described herein to facilitate the transfer of multiple data records with a single command.

Traditional storage I/O architectures utilize start subchannel instructions as part of an asynchronous model for accessing storage. This can add significant overhead with interrupt handling for completions and also scheduling overhead. Embodiments described herein provide a new synchronous command that allows an OS to either read or write one or more data records synchronously, such that the data record access can be guaranteed to be complete when the command completes.

Embodiments described herein include mechanisms for connecting a server to a persistent storage control unit (SCU) directly using a low latency I/O interface link such as peripheral component interconnect express (PCIe) link. These mechanisms eliminate several of the layers utilized by traditional enterprise storage attachments such as fibre connection (FICON), high performance FICON (HPF), fibre channel protocol (FCP), small computer system interface (SCSI) remove direct memory access (RDMA) protocol (SRP), and Internet SCSI extension for RDMA (iSER). Traditional enterprise storage attachments typically have multiple protocol layers that require several hardware, firmware, and software levels of processing which can lead to inefficiencies and add latency. By eliminating many of these layers, embodiments described herein improve efficiency while still providing the traditional enterprise qualities of data integrity and resiliency. The latency of reading or writing storage records can be greatly reduced when embodiments described herein are utilized. For example, in some embodiments, the latency of a read operation is less than a fifth of the latency of the same read operations when HPF is utilized.

Embodiments described herein include a new synchronous input/output (I/O) central processing unit (CPU) instruction or command that allows both the synchronous execution of read and write I/O operations, or the initiation of an I/O operation and subsequent synchronous test for completion. In embodiments, a synchronous low latency protocol running over an interface link such as peripheral component interconnect express (PCIe) is utilized to communicate directly between a processor (also referred to herein as a server) and a storage subsystem. The storage subsystem receives mailbox commands, delivered from the CPU over the PCIe link, that request the synchronous execution of read/write commands. For a read command, if the data is not already in the control unit cache the synchronous command ends unsuccessfully. The control unit can initiate processing to asynchronously read the data into the control unit cache so that it can quickly be read via traditional I/O processing. If the data was in the cache, it can be transferred to the host memory and the synchronous I/O CPU instruction completes successfully. Write operations can transfer data from host memory to the control unit cache of one or more nodes within the control unit.

Embodiments of synchronous I/O described herein when compared to traditional I/O can be utilized to eliminate the overhead associated with a dispatcher, improve transactional latency, preserve contents of L1 and L2 cache by eliminating a context switch, and can reduce lock contention on data by reducing latency.

Described herein is a new dynamic I/O paradigm for storage that can perform both synchronous and asynchronous (or traditional) processing from the application/middleware point of view. When applied to middleware, such as DB2® from IBM®, this new paradigm can result in faster performance. Current versions of DB2 can only have one I/O operation writing to the log at any one time. This single threaded process is highly dependent on the latency of these log write commands for the total throughput that can be accommodated for processing transactions. Embodiments of the synchronous I/O paradigm described herein can reduce the amount of time that it takes to write to the log. Note, that multi-write technology (e.g., zHyperWrite® technology produced by IBM) provides a way of eliminating the latency required by synchronous replication of data. The combination of embodiments described herein with the use of multi-write technology can provide the ability to maintain continuous availability with multi-switch technology (e.g., HyperSwap technology produced by IBM) while getting the benefits of synchronous I/O.

The workloads that run on the z/OS® (an OS from IBM) can typically see very high cache hit ratios (e.g., 90 percent) for read operations. This means that a high percent of the time the data is found in a dynamic random access memory (DRAM) cache in the storage subsystem (e.g., a persistent storage control unit), resulting in reduced I/O service times. These high cache hit ratios can be the result of a long tradition of close integration of the I/O stack from the applications ability to pass cache hints on I/O operations through optimized caching algorithms in the storage subsystem. When the data required for a read request is in DRAM in the storage subsystem it is amenable to being transferred to the host with the new synchronous I/O paradigm. If a cache miss occurs, the storage subsystem can initiate the process to bring the data into cache but synchronously notify the host to execute the I/O operation using the traditional asynchronous model.

Utilizing embodiments described herein to avoid the un-dispatching and re-dispatching of critical applications and middleware, can lead to a reduction in OS overhead and eliminate the L1 and L2 cache damage that can occur when a context switch occurs for a different application. Reducing the L1 and L2 cache damage and re-dispatching of work can lead to a significant reduction in CPU cost.

When embodiments are applied to DB2 executing on a z/OS platform, utilizing embodiments to accelerate read I/O and data base logging can reduce DB2 transactional latency and accelerate transaction processing on the z/OS platform.

In addition, improving database log throughput can reduce cost by requiring fewer data sharing instances (LPARs, I/O connections, log devices) to achieve the work load requirements. It can also avoid forcing clients to re-engineer the workloads in order to avoid hitting constraints.

Turning now to FIG. 1, communication schematics 100 of a traditional I/O and a synchronous I/O when updating data stored on a peripheral storage device are generally shown in accordance with embodiments. As shown on the right side of FIG. 1, performing traditional I/O operations includes receiving a unit of work request 124 at an operating system (OS) 122 in a logical partition (LPAR). The unit of work can be submitted, for example, from an application or middleware that is requesting an I/O operation. As used herein the term "unit of work" refers to dispatchable tasks or threads.

In response to receiving the unit of work request, the OS 122 performs the processing shown in block 104 to request a data record. This processing includes scheduling an I/O request by placing the I/O request on a queue for the persistent storage control unit (CU) 102 that contains the requested data record 104, and then un-dispatching the unit of work. Alternatively, the application (or middleware) can receive control back after the I/O request is scheduled to possibly perform other processing, but eventually the application (or middleware) relinquishes control of the processor to allow other units of work to be dispatched and the application (or middleware) waits for the I/O to complete and to be notified when the data transfer has completed with or without errors.

When the persistent storage control unit (SCU) 102 that contains the data record 104 is available for use and conditions permit, the I/O request is started by the OS issuing a start sub-channel instruction or other instruction appropriate for the I/O architecture. The channel subsystem validates the I/O request, places the request on a queue, selects a channel (link) to the persistent SCU 102, and when conditions permit begins execution. The I/O request is sent to a persistent SCU 102, and the persistent SCU 102 reads the requested data record from a storage device(s) of the persistent SCU 102. The read data record along with a completion status message is sent from the persistent SCU 102 to the OS 122. Once the completion status message (e.g., via an I/O interrupt message) is received by the OS 122, the OS 122 requests that the unit of work be re-dispatched by adding the unit of work to the dispatch queue. This includes re-dispatching the LPAR to process the interrupt and retrieving, by the I/O supervisor in the OS, the status and scheduling the application (or middleware) to resume processing. When the unit of work reaches the top of the dispatch queue, the unit of work is re-dispatched.

Still referring to the traditional I/O, once the data record is received by the OS 122, the OS 122 performs the processing in block 106 to update the data record that was received from the persistent SCU 102. At block 108, the updated data record is written to the persistent SCU 102. As shown in FIG. 1, this includes the OS 122 scheduling an I/O request and then un-dispatching the instruction. The I/O request is sent to a persistent SCU 102, and the persistent SCU 102 writes the data record to a storage device(s) of the persistent SCU 102. A completion status message (e.g., an interruption message) is sent from the persistent SCU 102 to the OS 122. Once the completion status message is received by the OS 122, the OS 122 requests that the unit of work be re-dispatched by adding the unit of work to the dispatch queue. When the unit of work reaches the top of the dispatch queue, the unit of work is re-dispatched. At this point, the unit of work is complete. As shown in FIG. 1, the OS 122 can perform other tasks, or multi-task, while waiting for the I/O request to be serviced by the persistent SCU 102.

The traditional I/O process is contrasted with a synchronous I/O process. As shown in FIG. 1, performing a synchronous I/O includes receiving a unit of work request at the OS 122. In response to receiving the unit of work request, the OS 122 performs the processing shown in block 114 which includes synchronously requesting a data record from the persistent SCU 112 and waiting until the requested data record is received from the persistent SCU 112. Once the data record is received by the OS 122, the OS 122 performs the processing in block 116 to update the data record. At block 118, the updated data record is synchronously written to the persistent SCU 112. A synchronous status message is sent from the persistent SCU 112 to the OS 122 to indicate the data has been successfully written. At this point, the unit of work is complete. As shown in FIG. 1, the OS 122 is waiting for the I/O request to be serviced by the persistent SCU 112 and is not performing other tasks, or multi-tasking, while waiting for the I/O request to be serviced. Thus, in an embodiment, the unit of work remains active (i.e., it is not un-dispatched and re-dispatched) until the OS is notified that the I/O request is completed (e.g., data has been read from persistent SCU, data has been written to persistent SCU, error condition has been detected, etc.).

Thus, as shown in FIG. 1, synchronous I/O provides an interface between a server and a persistent SCU that has sufficiently low overhead to allow an OS to synchronously read or write one or more data records. In addition to the low overhead protocol of the link, an OS executing on the server can avoid the scheduling and interruption overhead by using a synchronous command to read or write one or more data records. Thus, embodiments of synchronous I/O as described herein when compared to traditional I/O not only reduce the wait time for receiving data from a persistent SCU, they also eliminate steps taken by a server to service the I/O request. Steps that are eliminated can include the un-dispatching and re-dispatching of a unit of work both when a request to read data is sent to the persistent SCU and when a request to write data is sent to the persistent SCU. This also provides benefits in avoiding pollution of the processor cache that would be caused by un-dispatching and re-dispatching of work.

As used herein, the term "persistent storage control unit" or "persistent SCU" refers to a storage area network (SAN) attached storage subsystem with a media that will store data that can be accessed after a power failure. As known in the art, persistent SCUs are utilized to provide secure data storage even in the event of a system failure. Persistent SCUs can also provide backup and replication to avoid data loss. A single persistent SCU is typically attached to a SAN and accessible by multiple processors.

As used herein, the term "synchronous I/O" refers to a CPU synchronous command that is used to read or write one or more data records, such that when the command completes successfully, the one or more data records are guaranteed to have been transferred to or from the persistent storage control unit into host processor memory.

Figure 2:
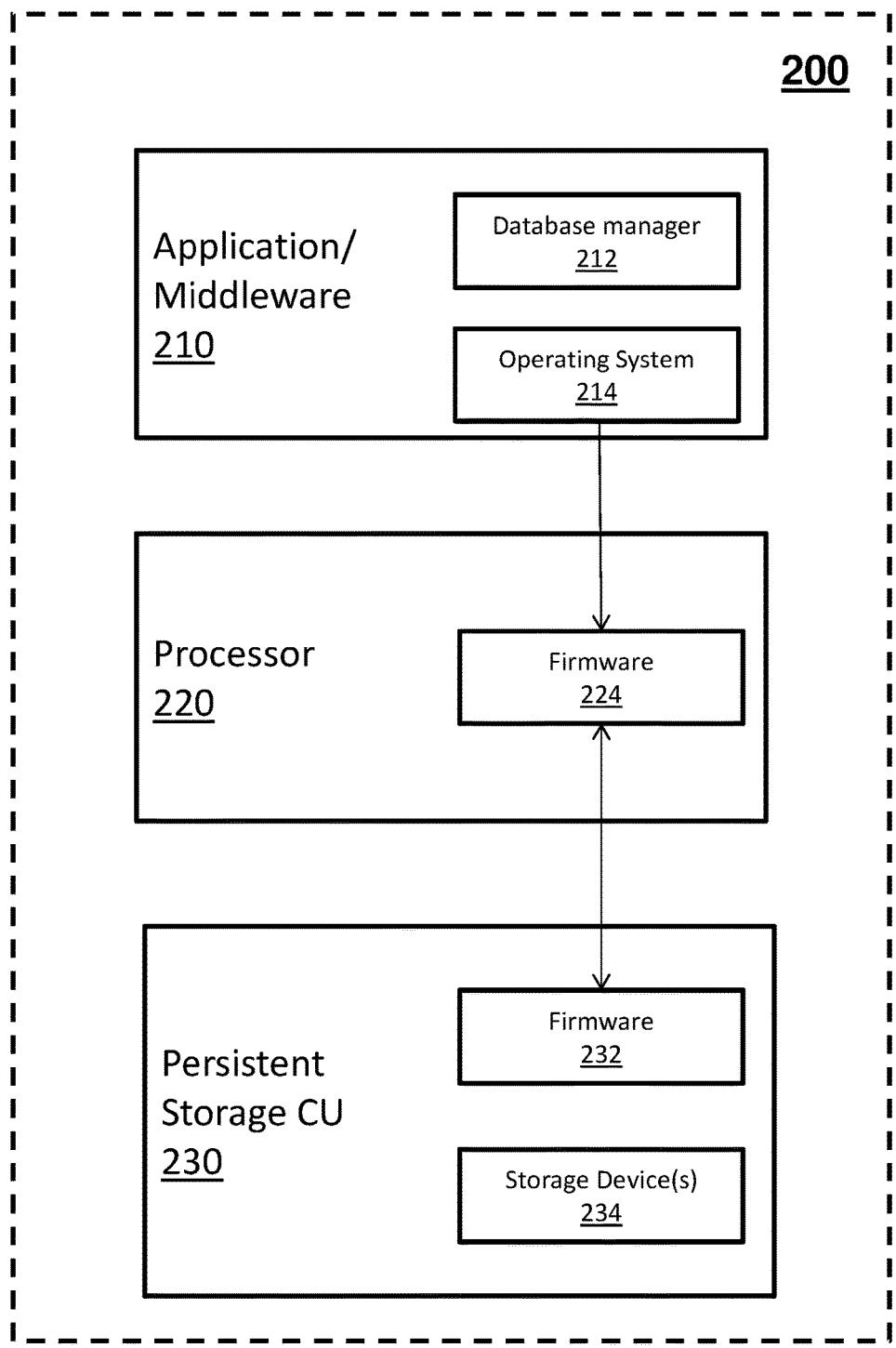
FIG. 2 illustrates a block diagram of a system for performing synchronous I/O in accordance with an embodiment.

Turning now to FIG. 2, a block diagram of a system 200 (e.g., synchronous system) for performing synchronous I/O is generally shown in accordance with an embodiment. The system 200 shown in FIG. 2 includes one or more application/middleware 210, one or more physical processors 220, and one or more persistent SCUs 230. The application/middleware 210 can include any application software that requires access to data located on the persistent SCU 230 such as, but not limited to a relational database manager 212 (e.g. DB2), an OS 214, a filesystem (e.g., z/OS Distributed File Service System z File System produced by IBM), a hierarchical database manager (e.g. IMS® produced by IBM), or an access method used by applications (e.g. virtual storage access method, queued sequential access method, basic sequential access method). As shown in FIG. 2, the database manager 212 can communicate with an OS 214 to communicate a unit of work request that requires access to the persistent SCU 230. The OS 214 receives the unit of work request and communicates with firmware 224 located on the processor 220 to request a data record from the persistent SCU 230, to receive the data record from the persistent SCU 230, to update the received data record, to request the persistent SCU 230 to write the updated data record, and to receive a confirmation that the updated data recorded was successfully written to the persistent SCU 230. The firmware 224 accepts the synchronous requests from the OS 214 and processes them. Firmware 232 located on the persistent SCU 230 communicates with the firmware 224 located on the processor 220 to service the requests from the processor 220 in a synchronous manner.

As used herein, the term "firmware" refers to privileged code running on the processor that interfaces with the hardware used for the I/O communications; a hypervisor; and/or other OS software.

Embodiments described herein utilize peripheral component interconnect express (PCIe) as an example of a low latency I/O interface that may be implemented by embodiments. Other low latency I/O interfaces, such as, but not limited to Infiniband™ as defined by the InfiniBand Trade Association and zSystems coupling links can also be implemented by embodiments.

Figure 3:
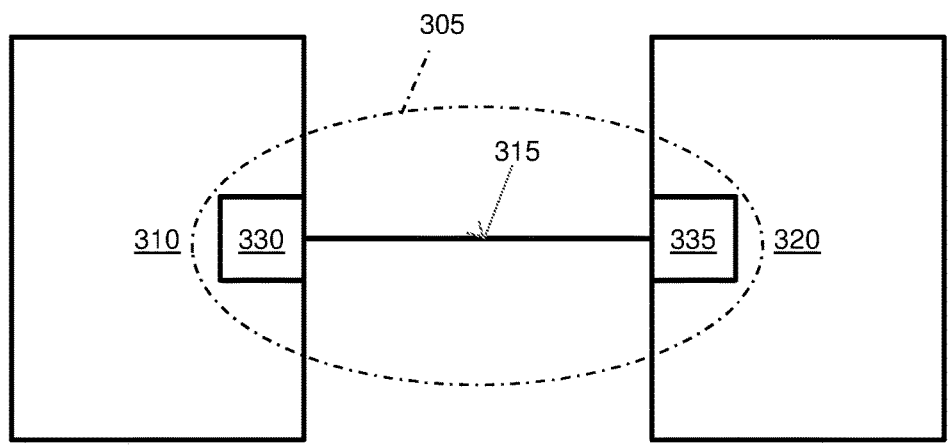
FIG. 3 illustrates a block diagram of an environment including a synchronous I/O link interface in accordance with an embodiment.

Turning now to FIG. 3, a block diagram of an environment 300 including a synchronous I/O link interface 305 is depicted in accordance with an embodiment. As shown in FIG. 3, the environment 300 utilizes the synchronous I/O link interface 305 as an interface between a server (e.g., a system 310) and a persistent SCU (e.g., a persistent SCU 320). The synchronous I/O link interface 305 has sufficiently low latency and protocol overhead to allow an OS of the system 310 to synchronously read or write one or more data records from the persistent SCU 320. In addition to the low protocol overhead of the link, the OS can avoid the overhead associated with scheduling and interrupts by using a synchronous command via the synchronous I/O link interface 305 to read or write one or more data records. The synchronous I/O link interface 305, for example, can be provided as an optical interface based on any PCIe base specification (as defined by the PCI-SIG) using the transaction, data link, and physical layers. The synchronous I/O link interface 305 may further include replay buffers and acknowledgement credits to sustain full bandwidth.

The system 310 is configured to provide at least one synchronous I/O link interface 305 having at least one synchronous I/O link 315 to allow connection to at least one persistent SCU (e.g., persistent SCU 320). It can be appreciated that two or more synchronous I/O links 315 may be required for each connection to a persistent SCU. It can also be appreciated that two or more synchronous I/O links 315 may support switch connections to a persistent SCU. In an exemplary embodiment, where PCIe is utilized, the system 310 comprises a PCIe root complex 330 for the interface link 315, while the persistent SCU 320 comprises a PCIe endpoint 335 for the control unit synchronous I/O interface 305.

Figure 4:
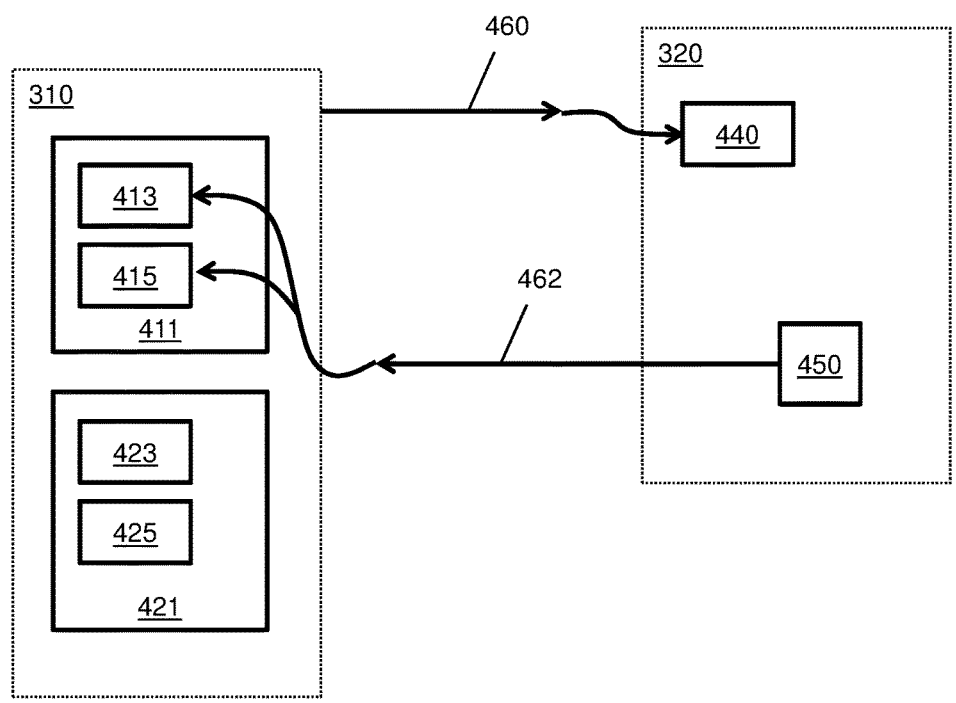
FIG. 4 illustrates a block diagram of an environment for performing synchronous I/O with respect to a mailbox command and read operation in accordance with an embodiment.

Turning now to FIG. 4, a block diagram of an environment 400 for performing synchronous I/O with respect to a mailbox command and read operation is depicted in accordance with an embodiment. As shown in FIG. 4, the environment 400 includes a system 310 (e.g., includes the application/middleware 210 and processor 200 of FIG. 2) and a persistent SCU 320 (e.g., includes persistent CU 230 of FIG. 2). The system 310 includes a LPAR 411 comprising memory locations for a data record 413 and an associated suffix 415 and a status area 421 comprising a device table entry (DTE) 423 and a status field 425. DTE 423 is an example of a data structure used by the firmware to store the mappings, such as, between virtual addresses and physical addresses. Similarly, a function table entry (FTE) is an example of a data structure used by a function table to indicate access to a specified synchronous I/O link. The persistent SCU 320 includes at least one mailbox 440 and a data record 450.

In operation, synchronous I/O commands issued by the OS of the system 310 are processed by the firmware 224 to build a mailbox command 460 that is forwarded to the persistent SCU 320. For example, upon processing a synchronization I/O command for the OS by a firmware of the system 310, the firmware prepares hardware of the system 310 and sends the mailbox command 460 to the persistent SCU 320. The mailbox command 460 is sent to the persistent SCU 320 in one or more memory write operations (e.g., over PCIe, using a PCIe base mailbox address that has been determined during an initialization sequence described below). A plurality of mailboxes can be supported by the persistent SCU 320 for each synchronous I/O link 305. A first mailbox location of the plurality of mailboxes can start at the base mailbox address, with each subsequent mailbox location sequentially located 256-bytes after each other. After the mailbox command 460 is sent, the firmware can poll the status area 421 (e.g., a status field 425) for completion or error responses. In embodiments, the status area 421 is located in privileged memory of the system 310 and is not accessible by the OS executing on the system 310. The status area 421 is accessible by the firmware on the system 310 and the firmware can communicate selected contents (or information related to or based on contents) of the status area 421 to the OS (e.g., via a command response block).

In general, a single mailbox command 460 is issued to each mailbox at a time. A subsequent mailbox command will not issue to a mailbox 440 until a previous mailbox command has completed or an error condition (such as a timeout, when the data is not in cache, error in the command request parameters, etc.) has been detected. Successive mailbox commands for a given mailbox 440 can be identified by a monotonically increasing sequence number. Mailboxes can be selected in any random order. The persistent SCU 320 polls all mailboxes for each synchronous I/O link 305 and can process the commands in one or more mailboxes in any order. In an embodiment, the persistent SCU 320 polls four mailboxes for each synchronous I/O link 305. Receipt of a new mailbox command with an incremented sequence number provides confirmation that the previous command has been completed (either successfully or in error by the system 310). In an embodiment, the sequence number is also used to determine an offset of the status area 421. The mailbox command can be of a format that includes 128-bytes. The mailbox command can be extended by an additional 64-bytes or more in order to transfer additional data records. In an embodiment, a bit in the mailbox command is set to indicate the absence or presence of the additional data records.

The mailbox command can further specify the type of data transfer operations, e.g., via an operation code. Data transfer operations include read data and write data operations. A read operation transfers one or more data records from the persistent SCU 320 to a memory of the system 310. A write operation transfers one or more data records from the memory of the system 310 to the storage persistent SCU 320. In embodiments, data transfer operations can also include requesting that the persistent SCU 320 return its World Wide Node Name (WWNN) to the firmware in the server. In further embodiments, data transfer operations can also request that diagnostic information be gathered and stored in the persistent SCU 320.

In any of the data transfer operations the contents of the mailbox command can be protected using a cyclic redundancy check (CRC) (e.g., a 32 bit CRC). In an embodiment, the mailbox command can be protected by a checksum. In an embodiment, if the persistent SCU 320 detects a checksum error, a response code to indicate the checksum error is returned. Continuing with FIG. 4, a synchronous I/O read data record operation will now be described. For instance, if a mailbox command 460 includes an operation code set to read, the persistent SCU 320 determines if the data record or records 450 are readily available, such that the data transfer can be initiated in a sufficiently small time to allow the read to complete synchronously. If the data record or records 450 are not readily available (or if any errors are detected with this mailbox command 460), a completion status is transferred back to the system 310. If the read data records are readily available, the persistent SCU 320 provides 462 the data record 450.

In an embodiment, the persistent SCU 320 processes the mailbox command 460, fetches the data record 450, provides CRC protection, and transfers/provides the data record 450 over the synchronous I/O link 305. The persistent SCU 320 can provide 462 the data record 450 as sequential memory writes over PCIe, using the PCIe addresses provided in the mailbox command 460. Each data record may require either one or two PCIe addresses for the transfer as specified in the mailbox command 460. For example, if length fields in the mailbox command indicate the data record is to be transferred in a single contiguous PCIe address range, only one starting PCIe address is required for each record, with each successive PCIe memory write using contiguous PCIe addresses. In embodiments, the length fields specify the length in bytes of each data record to be transferred.

The data record 450 can include a data portion and a suffix stored respectively on data record 413 and suffix 415 memory locations of the logical partition 411 after the data record 450 is provided. The data record 413 can be count key data (CKD) or extended count key data (ECKD). The data record 413 can also be utilized under small computer system interface (SCSI) standards, such as SCSI fixed block commands. Regarding the suffix, at the end of each data record 450, an additional 4-bytes can be transferred comprising a 32-bit CRC that has been accumulated for all the data in the data record 450. The metadata of the suffix 415 can be created by an operating system file system used for managing a data efficiently. This can be transferred in the last memory write transaction layer packet along with the last bytes of the data record 450, or in an additional memory write.

In addition, a host bridge of the system 310 performs address translation and protection checks (e.g., on the PCIe address used for the transfers) and provides an indication in the DTE 423 to the firmware of the system 310 when the data read 462 is complete. The host bridge can also validate that the received CRC matches the value accumulated on the data transferred. After the last data record and corresponding CRC have been initiated on the synchronous I/O link 305, the persistent SCU 320 considers this mailbox command 460 complete and must be ready to accept a new command in this mailbox 440.

In an exemplary embodiment, the system 310 will consider the mailbox command 450 complete when all the data records 450 have been completely received and the corresponding CRC has been successfully validated. For example, the firmware performs a check of the status area 421 to determine if the data read 462 was performed without error (e.g., determines if the DTE 423 indicates 'done' or 'error'). If the data read 462 was performed without error and is complete, the firmware then completes the synchronous I/O command. The system 310 will also consider the mailbox command 450 complete if an error is detected during the data read 462 or CRC checking process, error status is received from the persistent SCU 320, or the data read 462 does not complete within the timeout period for the read operation.

Embodiments of the mailbox command can also include a channel image identifier that corresponds to a logical path previously initialized by the establish-logical-path procedure, for example over a fibre-channel interface. If the logical path has not been previously established, a response code corresponding to this condition can be written to the status area 421 to indicate that the logical path was not previously established.

The mailbox command block can also include a persistent SCU image identifier that corresponds to a logical path previously initialized by the establish-logical-path procedure. If the logical path has not been previously established, a response code corresponding to this condition can be written to the status area 421 to indicate that the logical path was not previously established.

The mailbox command block can also include a device address within the logical control unit (e.g., a specific portion of the direct access storage device located in the storage control unit) that indicates the address of the device to which the mailbox command is directed. The device address should be configured to the persistent SCU specified, otherwise the persistent SCU 320 can return a response code (e.g., to the status area 421 in the system 310) to indicate this condition.

The mailbox command block can also include a link token that is negotiated by the channel and the persistent SCU 320 each time the synchronous I/O link is initialized. If the persistent SCU 320 does not recognize the link token, it can return a value to the status area 421 that indicates this condition.

The mailbox command block can also include a WWNN that indicates the WWNN of the persistent SCU to which the command is addressed. In embodiments, it is defined to be the 64-bit IEEE registered name identifier as specified in the T11 Fibre-Channel Framing and Signaling 4 (FC-FS-4) document. If the specified WWNN does not match that of the receiving persistent SCU, then a response code indicating this condition is returned to processor.

The mailbox command block can also include device specific information that is used to specify parameters specific to this command. For example, for enterprise disk attachment when a write or read is specified by the operation code, device specific information can include the prefix channel command. In another example, when the operation code specifies that the command is a diagnostic command, the device specific information can include a timestamp representing the time at which this command was initiated and a reason code.

The mailbox command can also include a record count that specifies the number of records to be transferred by this synchronous I/O command (or mailbox command).

When PCIe is being utilized with a mailbox command that includes multiple 32 bit words, the mailbox command can include one or more PCIe data addresses in the following format: PCIe data address bits 63:32 in word "n" to specify the word-aligned address of the location in memory (e.g., in the processor) where data will be fetched for a write and stored for a read operation; and PCIe data addressing bits 31:2 in word "n+1". In addition word n+1 can include an end or record bit that can be set to indicate that the last word specified is the last word of the record that is to be read or written.

The mailbox command can also include a mailbox valid bit(s) that indicates whether the mailbox command is valid and whether the entire mailbox command has been received.

Figure 5:
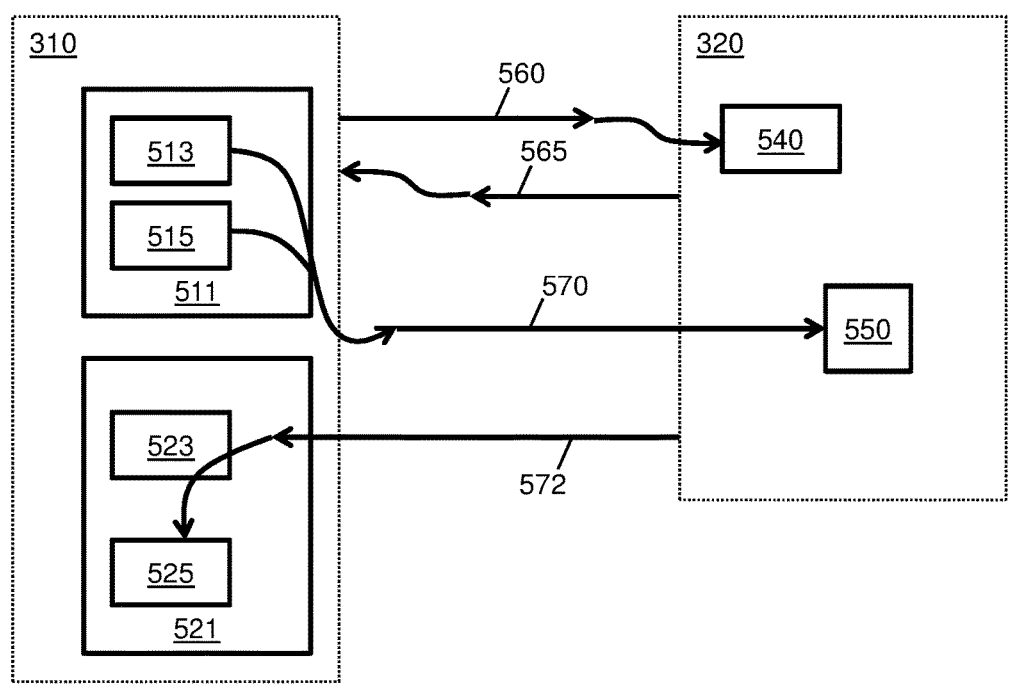
FIG. 5 illustrates a block diagram of an environment for performing synchronous I/O with respect to a write operation in accordance with an embodiment.

In view of the above, a synchronous I/O write data record operation will now be described with respect to FIG. 5 in accordance with an embodiment. As shown in FIG. 5, the environment 500 includes a system 310 and a persistent SCU 320. The system 310 includes a logical partition 511 comprising memory locations for a data record 513 and a suffix 515 and a status area 521 comprising a DTE 523 and a status field 525. The persistent SCU 320 includes at least one mailbox 540 and a data record 550 once written.

In operation, for example, upon processing a synchronization I/O command for the OS by a firmware of the system 310, the firmware prepares hardware of the system 310 and sends the mailbox command 560 to mailbox 540 of the persistent SCU 320. As noted above, a plurality of mailboxes can be supported by the persistent SCU 320 for each synchronous I/O link 305. Further, after the mailbox command 560 is sent, the firmware can poll the status area 521 (e.g., a status field 525) for completion or error responses.

If a mailbox command 560, issued to mailbox 540, includes an operation code set to write, the persistent SCU 320 determines if it is able to accept the transfer of the data record or records 550. If the persistent SCU 320 is not able to accept the transfer (or if any errors are detected with this mailbox command 560), a completion status is transferred back to the system 310. If the persistent SCU 320 is able to accept the transfer, the persistent SCU 320 issues memory read requests 565 for the data.

In an embodiment, the persistent SCU 320 processes the mailbox command 560 and issues a read request 565 over PCIe (using the PCIe addresses provided in the mailbox command 560) to fetch the data including the data record 513 and the suffix 515. In response to the read request 565, the host bridge of the system 310 performs address translation and protection checks on the PCIe addresses used for the transfers.

Further, the system 310 responds with memory read responses 570 to these requests. That is, read responses 570 are provided by the system 310 over the synchronous I/O link 305 to the persistent SCU 320 such that the data record 550 can be written. Each data record may require either one or two PCIe addresses for the transfer as specified in the mailbox command 560. For example, if the length fields in the mailbox command indicate the entire record can be transferred using a single contiguous PCIe address range, only one starting PCIe address is required for each record, with each successive PCIe memory read request using contiguous PCIe addresses. At the end of each data record, the additional 8-bytes will be transferred consisting of the 32-bit CRC that has been accumulated for all the data in the record and optionally an LRC or other protection data that has also been accumulated. The total number of bytes requested for each record can be 8-bytes greater than the length of the record to include the CRC protection bytes and the additional 4-bytes for a longitudinal redundancy check (LRC).

After the data and CRC/LRC protection bytes have been successfully received, the persistent SCU 320 responds by issuing a memory write 572 (e.g., of 8-bytes of data). The persistent SCU 320 considers this mailbox command 560 complete after initiating this status transfer and must be ready to accept a new command in this mailbox 540. The system 310 will consider the mailbox command 560 complete when the status transfer has been received. For example, the firmware performs a check of the status area 521 (e.g., determines if the DTE 523 indicates 'done' or 'error'). The system 310 will also consider the mailbox command 560 complete if an error is detected during the data transfer, error status is received from the persistent SCU 320, or the status is not received within the timeout period for this operation.

Figure 6:
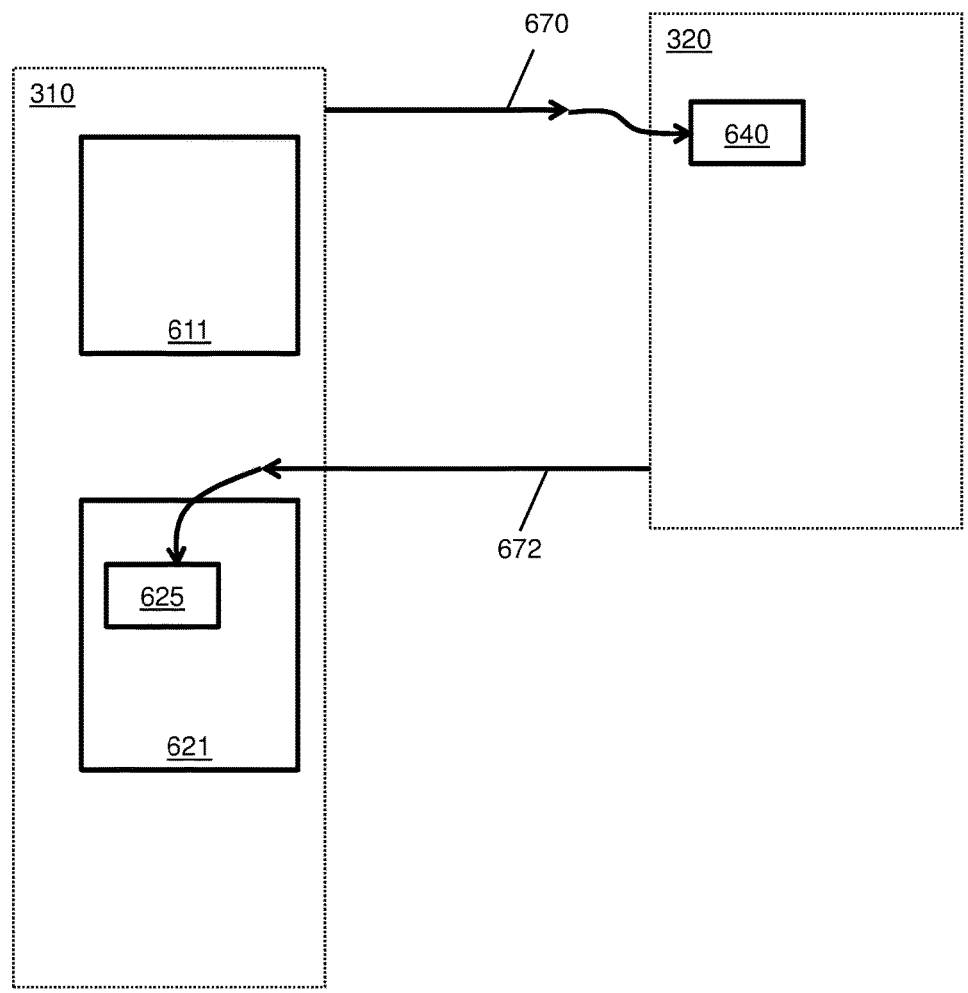
FIG. 6 illustrates a block diagram of an environment performing synchronous I/O with respect to a status operation in accordance with an embodiment.

FIG. 6 illustrates a block diagram of an environment 600 performing synchronous I/O with respect to a status operation in accordance with an embodiment. The status operation, for example, can be a completion status. As shown in FIG. 6, the environment 600 includes a system 310 and a persistent SCU 320. The system 310 includes a logical partition 611 and a status area 621 comprising one or more status fields 625. The persistent SCU 320 includes at least one mailbox 640.

In response to a status request 670, the completion status (as detected and recorded by the persistent SCU 320) is transferred 672 by the persistent SCU 310 to the system 310. In an embodiment where PCIe is utilized that status is transferred 672 to a 64-bit PCIe address that is offset from a status base address specified during an initialization exchange sequence. The status offset can be calculated as indicated in Equation 1.

$$\text{Offset} = (\text{Node\#} * 4096) + (\text{Mailbox\#} * 1024) + (\text{Sequence\#} * 256) \qquad \text{Equation 1}$$

In embodiments, when the persistent SCU 320 completes a read operation successfully, no status is written after the data transfer. The successful reception of the receive data with valid CRC is sufficient indication that the operation has completed successfully. In embodiments, when the persistent SCU 320 completes a write operation, the status is written 672 after the write data has been successfully received. In embodiments, when the persistent SCU 320 completes a command other than a read operation or a write operation, or it is unable to complete a read or write operation successfully, it transfers 672 status information to the server.

In embodiments, the status information can include a bit(s) that indicates whether the status information is valid or invalid. The system 310 can poll on this bit(s) looking for it to indicate valid status information so that it knows that status information has been written.

The status information can also include an error status indicator that indicates whether the mailbox command completed successfully (e.g., write data was successfully written to the persistent SCU 320) or not (e.g., write of data was not successfully written to the persistent SCU 320). In the event that the mailbox command was not successfully completed, the status information provides additional details about the error that was encountered by the persistent SCU 320.

In the event of an error, the status information can include a record number that specifies the record (if any) to which the status information pertains.

In the event of an error, the status information can include a control unit response code that indicates the reason for the synchronous I/O operation failure. Response codes can include, but are not limited to indications that: device-dependent data (e.g., invalid track) is not valid, see response code qualifier for details; incorrect length (e.g., length of data does not match record length); SCU device address invalid; device-dependent error status presented (e.g., data record not available); logical path not established; persistent SCU synchronous I/O busy; read data not immediately available on persistent SCU; write data space not immediately available on persistent SCU; persistent SCU in recovery; checksum error; invalid operation code; sequence number does not match (e.g., mailbox command dropped); link token does not match (e.g., link re-initialized); WWNN does not match (e.g., link connection changed); and/or invalid length.

In the event of an error, the status information can include a persistent SCU response code qualifier whose value may include either an architected value or a model or device dependent value that further describes the condition specified by the response code.

In the event of an error, the status information can include a WWNN of the persistent SCU returning the status information.

In the event of an error, the status information can include a control unit timestamp that indicates when the status condition was detected.

In the event of an error, the status information can include a diagnostic information identifier that indicates that diagnostic information is available in the persistent SCU and can be uniquely identified by the value in this field.

In the event of an error, the status information can include device specific status.

Figure 7:
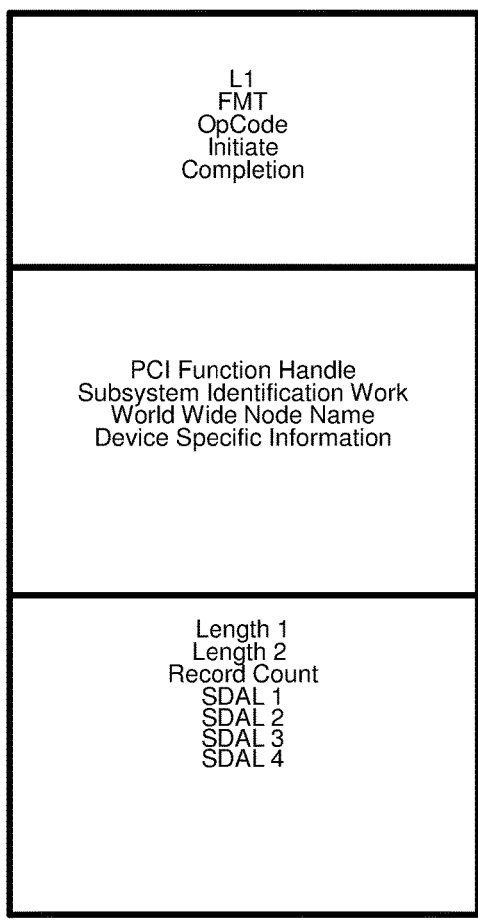
FIG. 7 illustrates a command request block and a mailbox command in accordance with an embodiment.
Figure 7:
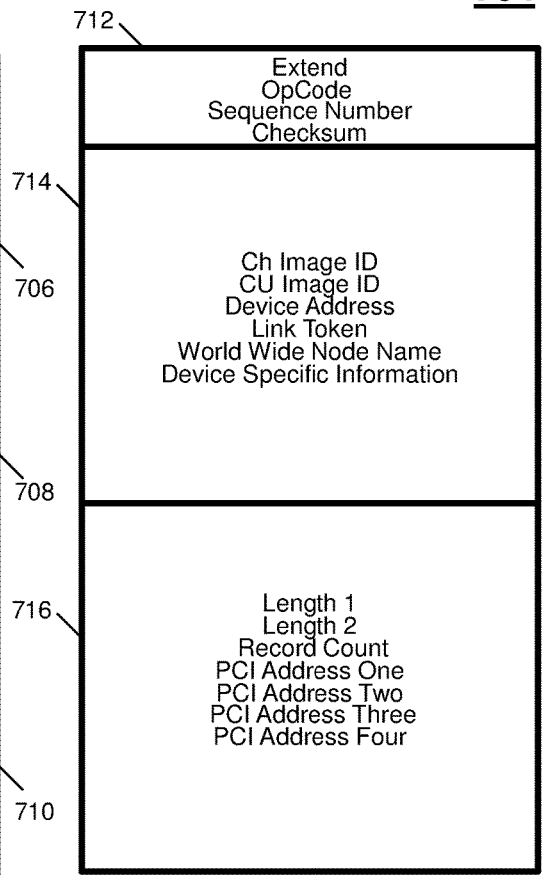

Turning now to FIG. 7, a synchronous I/O command request block 702 and a mailbox command 704 are generally shown in accordance with an embodiment. In an embodiment, an OS executing on a server generates a command request block 702 and transmits it to firmware located on the server. The firmware receives the command request block 702 and generates a mailbox command 704 based on contents of the command request block 702. The firmware can also perform verification of some or all of the contents of the command request block 702 as part of generating the mailbox command 704. In an embodiment, the mailbox command 704 (e.g., a synchronous I/O command) is then sent from the firmware on the server to a persistent SCU to initiate a synchronous I/O operation between the server and the persistent SCU. Embodiments of the mailbox command 704 described herein can be used to transfer data records to or from a persistent SCU, or to exchange control information. In embodiments, the command request block may be executed completely synchronously, or it may be used to issue a request to a persistent SCU synchronously and then re-issued to synchronously determine when the I/O operation is complete. In embodiments, a command response block 802 (described in more detail herein below with reference to FIG. 8) containing a response code(s) is generated by the firmware and transmitted back to the OS to communicate a status of the synchronous I/O request.

Turning now to the embodiment shown in FIG. 7 where the command request block 702 includes a target information portion 708 that can be utilized to indicate the persistent SCU that is the target of the synchronous I/O command. Embodiments of contents of the mailbox command 704 as shown in FIG. 7, including a metadata portion 712, a target information portion 714, and a data portion 716, have been previously described herein. In the embodiment shown in FIG. 7, PCIe is utilized as the low latency link protocol, and when PCIe is utilized, the target information portion 708 of the command request block 702 can include a PCI function handle (PFH) that designates the PCI function (e.g., link) to which the I/O operation is to be performed. The PFH is used by the firmware in conjunction with a function table entry (FTE) in a function table to determine whether the OS can access the link specified by the PFH. If the specified PFH is not recognized (e.g. it is outside of the range of PCI function handles that are supported (e.g., by a z/PCI facility), or the specified PFH is not configured or in standby state for the requesting configuration), then a response code indicating this condition can be returned to the OS in a command response block. The FTE also identifies the LPAR that is permitted access to this link, and this is validated by the firmware. If the operating system running in this LPAR is not permitted access, this is indicated in the command response block returned to the operating system.

As shown in FIG. 7, the target information portion 708 of the command request block can also include a subsystem identification word (SID) that designates the subchannel for which this command is to be executed. If the specified subchannel is not enabled, as determined for example by the firmware on the server, then a response code indicating this condition can be returned to the OS in the command response block. Once the SID is validated and determined to be enabled, the firmware can translate the SID into a channel image identifier, a persistent SCU image identifier and a persistent SCU device address for entry into a target information portion 714 of the mailbox command 704.

The target information portion 708 of the command request block 702 can also include the WWNN of the persistent SCU to which the command is addressed. If the specified WWNN does not match that of the persistent SCU connected to this synchronous I/O link, as specified in the FTE then a response code indicating this condition can be returned to the OS in the command response block.

The target information portion 708 of the command request block can also include device specific information, as described above, used to specify parameters specific to the command and the control unit architecture.

The embodiment of the command request block 702 shown in FIG. 7 also includes a data portion 710 which includes one or more lengths (e.g., in bytes) of each data record to be made available to the persistent SCU during the synchronous I/O operation and a record count to indicate a number of data records to be made available. As shown in the data portion 710 of the command request block 702 shown in FIG. 7, a data record may be referenced by one or two synchronous I/O data address lists (SDALs). In an embodiment, when the data record is referenced by one SDAL, the field "length 1" in the command request block 702 specifies the length of the data record in bytes and field "length 2" is set to zero. In an embodiment, when the data record is referenced by two SDALS, the field "length 1" in the command request block 702 specifies the length of the portion of the data record referenced by the first SDAL, and field "length 2" specifies the length of the portion referenced by the second SDAL.

The embodiment of the data portion 710 of the command request block 702 shown in FIG. 7 includes four SDALs. In an embodiment, each SDAL includes a list of synchronous I/O data address words (SDAWs) that define a contiguous area in memory in the server (e.g., that may span one or more 4K pages) to which the data will be stored or from which it will be fetched for the synchronous I/O operation. The number and location of SDAWs required for a synchronous I/O operation can be determined by the length and record count fields and by the first data address in each SDAL. In an embodiment, the maximum number of SDAWs in all SDALs is limited to 24. In an embodiment each SDAW specifies a data address in the memory of the server. In an embodiment, bits 0:59 of each SDAW specify an absolute address of the location in memory where data will be fetched for a write and stored for a read operation. The first SDAW in an SDAL can have a data address that may have any alignment, and all subsequent SDAWs in the SDAL can be processed as data addresses that are 4K-aligned (e.g., only bits 0-51 are used).

The command request block 702 shown in FIG. 7 also includes a metadata portion 706 that includes a length of the command request block (e.g., in bytes); a command code which specifies that the command is a synchronous I/O command; format information which specifies the format of the command request block; an operation code as described previously which specifies the operation to be performed; an initiate request bit(s) to indicate whether the synchronous I/O command will complete after the request has been successfully initiated or when the entire write operation completes; a completion request bit(s) to indicate whether the command is completing a previously initiated command; and/or a key that includes an access key that can be used when the synchronous I/O facility attempts to access the storage specified by this command.

Figure 8:
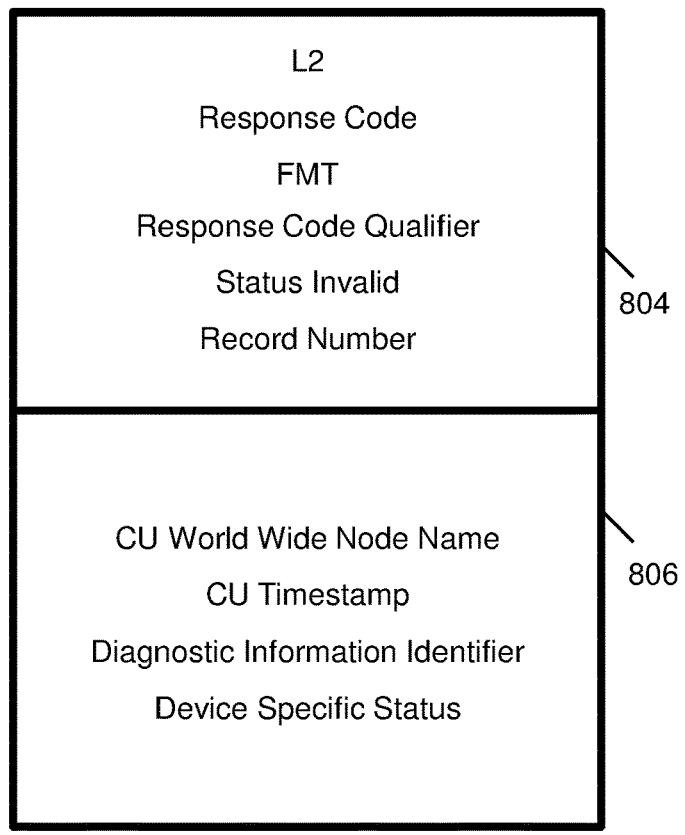
FIG. 8 illustrates a command response block in accordance with an embodiment.

Turning now to FIG. 8, a command response block 802 is generally shown in accordance with an embodiment. In an embodiment, the command response block 802 contains completion status information that is sent back to the OS that requested the synchronous I/O operation. The OS can utilize the information in the command response block 802 to determine a next action to take (e.g., resubmit the I/O operation asynchronously, resubmit the I/O operation as a synchronous I/O operation on an alternate path, initiate a new unit of work, etc.). As shown in FIG. 8, the command response block 802 can include a header portion 804 that includes a value that specifies a length of the command response block (the length can depend for example, on how much status information is included), and a response code(s) that describes the results of the attempt to execute the synchronous I/O command. Response codes in the command response block 802 can include, but are not limited to those that indicate: a synchronous I/O request has successfully completed, has been successfully initiated; a PCI function handle is not recognized; a PCI function handle is not enabled; a SID is not recognized; a subchannel is not enabled; a WWNN does not match the control unit connected to this Synch I/O link; a PCI function is in a permanent-error state; PCI error recovery has been initiated; a PCI function is busy; an invalid SDAL format; an invalid initiate or completion request; an invalid length; an invalid record count; an invalid opcode; device-dependent data is not valid; an incorrect length (does not match record length); device address invalid; device-dependent error status presented; logical path not established; control unit synchronous I/O busy; read data not immediately available; write data space not immediately available; operation timed out; local storage access error; and/or read data CRC data protection error.

The header portion 804 of the command response block 802 can also store a format value that indicates the format of the command response block and/or a response code qualifier value that further describes a condition specified by the response code (e.g., a storage exception due to a key mis-match, an invalid main storage mismatch, an uncorrectable error). Additional fields in the command response block can include one or more of, but are not limited to: a status bit(s) that indicates that additional status information is provided in another location in the command response block; and a record number which specifies the record to which the status pertains. As shown in FIG. 8, a diagnostic portion 806 of the command response block 802 can include: a persistent SCU WWNN of the persistent SCU associated with this response; a control unit timestamp representing the time at which the status condition was detected; a diagnostic information identifier indicating that diagnostic information is available in the control unit, and can be uniquely identified by the value in this field; and a device specific status indicating that another location of the command response block contains additional status information that is specific to the device.

It should be understood that the layouts and contents of the command request block 702, mailbox command 704, and the command response block 802 are examples and not intended to be limiting. Other layouts and contents can be implemented by embodiments described herein.

Figure 9:
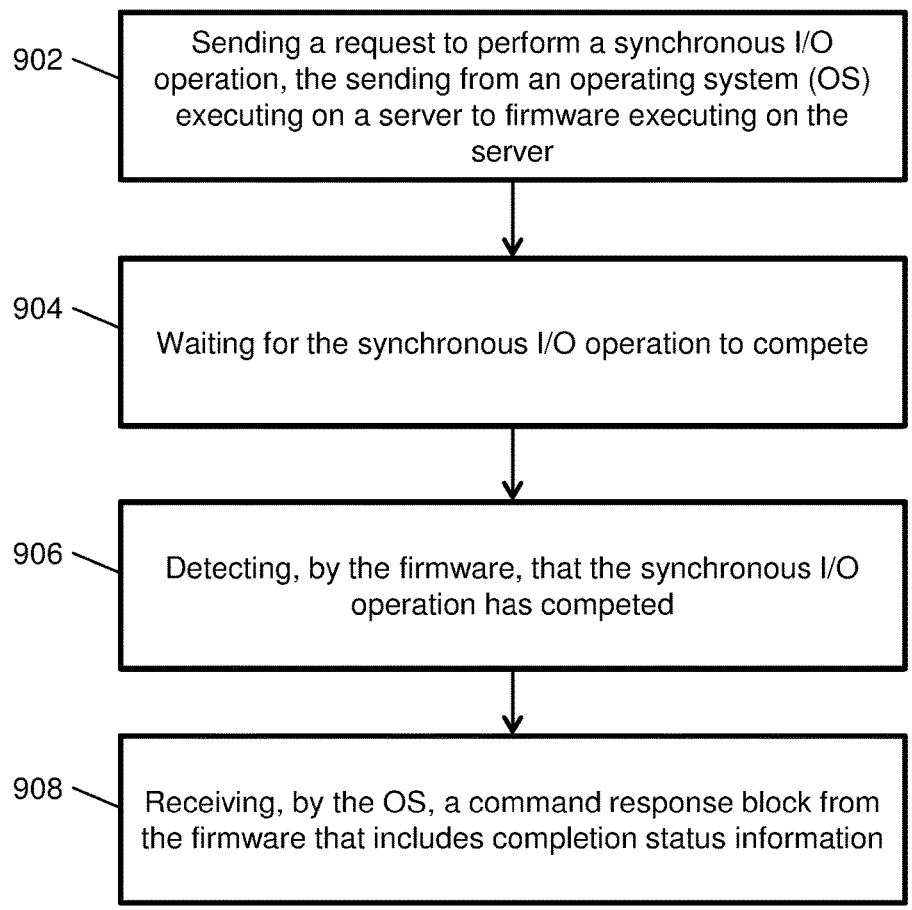
FIG. 9 illustrates a process for initiating a synchronous I/O command in accordance with an embodiment.

Turning now to FIG. 9, a process for initiating a synchronous I/O command is generally shown in accordance with an embodiment. In an embodiment, the processing shown in FIG. 9 is performed by an OS executing on a server. At block 902, a request to perform a synchronous I/O operation is sent from the OS executing on a server to firmware located on the server. The synchronous I/O request includes a command request block, such as command request block 702. At block 904, the OS waits for the synchronous I/O to complete (e.g., either by successfully performing the synchronous I/O operation or by encountering an error condition that prevented the synchronous I/O operation to be performed). While the OS is waiting for the synchronous I/O operation to complete, the unit of work that includes the synchronous I/O operation remains active. At block 906, the OS detects that the synchronous I/O operation has completed by control being returned and the status of the completion being indicated in the command response block. When the synchronous I/O operation is a read operation, the firmware detects when the operation completes by checking the status areas 421 to determine if the data transfer completed or if a status response was received from the control unit. When the synchronous I/O operation is a write operation, the firmware detects that it has completed by checking status area 421. The firmware may also detect an error completion such as a timeout where no status update has occurred. At block 908, a command response block, such as command response block 802, is received from the firmware located on the server. The OS can utilize contents of the command response block 802 to perform diagnostics in the event of an error condition and to determine a next action (e.g., resubmit the synchronous I/O command, submit an asynchronous I/O command, etc.).

Figure 10:
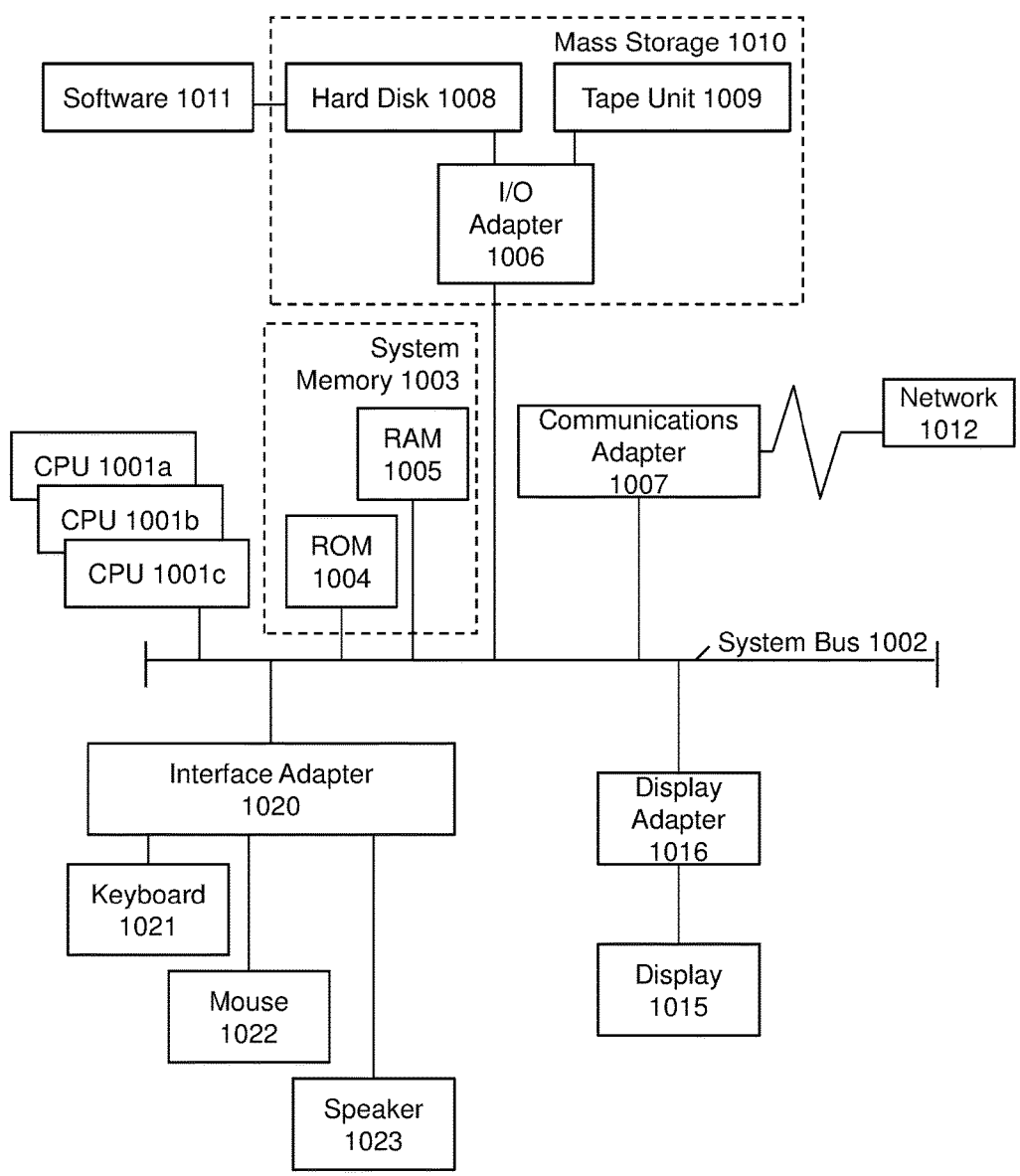
FIG. 10 illustrates a processing system in accordance with an embodiment of the present invention.

Referring now to FIG. 10, there is shown an embodiment of a processing system 1000 for implementing the teachings herein. In this embodiment, the processing system 1000 has one or more central processing units (processors) 1001a, 1001b, 1001c, etc. (collectively or generically referred to as processor(s) 1001). The processors 1001, also referred to as processing circuits, are coupled via a system bus 1002 to system memory 1003 and various other components. The system memory 1003 can include read only memory (ROM) 1004 and random access memory (RAM) 1005. The ROM 1004 is coupled to system bus 1002 and may include a basic input/output system (BIOS), which controls certain basic functions of the processing system 1000. RAM is read-write memory coupled to system bus 1002 for use by processors 1001.

FIG. 10 further depicts an input/output (I/O) adapter 1006 and a network adapter 1007 coupled to the system bus 1002. I/O adapter 1006 may be a small computer system interface (SCSI) adapter that communicates with a hard disk 1008 and/or tape storage drive 1009 or any other similar component. I/O adapter 1006, hard disk 1008, and tape storage drive 1009 are collectively referred to herein as mass storage 1010. Software 1011 for execution on processing system 1000 may be stored in mass storage 1010. The mass storage 1010 is an example of a tangible storage medium readable by the processors 1001, where the software 1011 is stored as instructions for execution by the processors 1001 to perform a method, such as the process flows described herein. Network adapter 1007 interconnects system bus 1002 with an outside network 1012 enabling processing system 1000 to communicate with other such systems. A screen (e.g., a display monitor) 1015 is connected to system bus 1002 by display adapter 1016, which may include a graphics controller to improve the performance of graphics intensive applications and a video controller. In one embodiment, adapters 1006, 1007, and 1016 may be connected to one or more I/O buses that are connected to system bus 1002 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1002 via an interface adapter 1020 and the display adapter 1016. A keyboard 1021, mouse 1022, and speaker 1023 can be interconnected to system bus 1002 via interface adapter 1020, which may include, for example, a Super I/O chip integrating multiple device adapters into a single integrated circuit.

Thus, as configured in FIG. 10, processing system 1005 includes processing capability in the form of processors 1001, and, storage capability including system memory 1003 and mass storage 1010, input means such as keyboard 1021 and mouse 1022, and output capability including speaker 1023 and display 1015. In one embodiment, a portion of system memory 1003 and mass storage 1010 collectively store an OS, such as the z/OS or AIX OS from IBM Corporation, to coordinate the functions of the various components shown in FIG. 10.

Technical effects and benefits of the embodiments herein provide advantages over asynchronous/traditional I/O commands by avoiding overhead of interrupt processing, context switch and un-dispatch/re-dispatch of the unit of work.

For instance, asynchronous/traditional I/O commands include the disadvantage that while waiting on an I/O operation to complete, a processor executes other productive work, causing overhead for un-dispatch and re-dispatch, context switch overhead with the I/O interrupt and the processor cache content change. In contrast, embodiments herein allows multiple synchronous I/O commands to be initiated, thus allowing multiple synchronous I/O operations to begin, while also allowing additional work to be performed before resuming the command to determine when the I/O operation completes. Further, synchronous I/O commands allow an operating system to issue multiple synchronous I/O commands to multiple targets or transfer multiple records to the same or different targets, to achieve parallelism, and thus improved performance over multiple operations.

In another example, traditional enterprise storage attachments, such as Fiber Connection (FICON) and Fibre Channel Protocol (FCP), have multiple protocol layers that require several hardware, firmware and software levels of processing which cause overhead and add latency. In contrast, the synchronous I/O of embodiments herein eliminates many of these layers, thus improving system efficiency while providing the enterprise qualities of service that includes end-to-end data integrity checking, in-band instrumentation and measurements, work load management and continuous availability with predictable and repeatable high performance.

Embodiments described herein provide SAN attached external persistent storage for synchronous access. In addition, embodiments provide the dynamic switching between synchronous I/O and asynchronous I/O access. Shareable external SAN storage typically will have a mix of short and long running I/O operations which can utilized and benefit from this ability to dynamically switch between the synchronous and asynchronous selection. Embodiments also provide a means for notifying software when the data is not available for synchronous access and the dynamic switching to asynchronous access.

Embodiments described herein provide a low-latency protocol for server to SAN storage communication that allows synchronous I/O access with its inherent advantages of avoiding context switches, interruptions and processor cache pollution, while also providing mechanisms for avoiding processor blocking when access times become too great. Mechanisms are described for dynamic notification and selection of synchronous or asynchronous I/O access.

Thus, embodiments described herein are necessarily rooted in a processing system to perform proactive operations for efficiently replicating data across multiple storage subsystems in order to provide continuous availability to overcome problems specifically arising in the realm of traditional I/O and storage subsystem failures.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing synchronous input/output (I/O) operations, the method comprising:

sending, from an operating system (OS) executing on a server to firmware located on the server, a request to perform a unit of work that includes a synchronous I/O operation, the request comprising a variable length command request block that includes format information specifying a format of the command request block, an operation code identifying the synchronous I/O operation as a synchronous read operation or a synchronous write operation, an identifier of a persistent storage control unit (SCU), and an access key for accessing storage specified by the synchronous I/O operation;

waiting, by the OS, for the synchronous I/O to complete, wherein the unit of work remains active during the waiting;

detecting, by the firmware, that the synchronous I/O operation has completed;

receiving, by the OS, a command response block from the firmware that includes completion status information about the synchronous I/O operation; and completing the unit of work in response to the I/O operation completing, wherein the command request block further includes an incremented sequence number that provides the SCU with an offset of a status area within the firmware for the command response block and a confirmation that a previous command has been completed.

2. The method of claim 1, wherein the synchronous I/O operation is the synchronous read operation and the detecting includes determining that data from the persistent SCU has been written to a memory location on the server.

3. The method of claim 1, wherein the synchronous I/O operation is the synchronous write operation and the detecting includes receiving a status message in a memory location on the server indicating that the synchronous I/O operation has been completed.

4. The method of claim 1, wherein the completion status information in the command response block indicates that the synchronous I/O operation completed successfully.

5. The method of claim 1, wherein the completion status information in the command response block indicates that the synchronous I/O operation completed in an error state.

6. The method of claim 1, further comprising creating the command request block based on completion information about the synchronous I/O operation.

7. The method of claim 1, wherein the OS utilizes contents of the command response block to determine a next action by the OS.

* * * * *